May 1, 1934.  T. C. PROUTY ET AL  1,956,877
VEHICLE STEERING MECHANISM
Original Filed Dec. 28, 1931   3 Sheets-Sheet 1

INVENTORS.
THEODORE C. PROUTY deceased
DALLAS R. TINKLE
WILLIS O PROUTY ADMINISTRATOR
by John Flam
Attorney

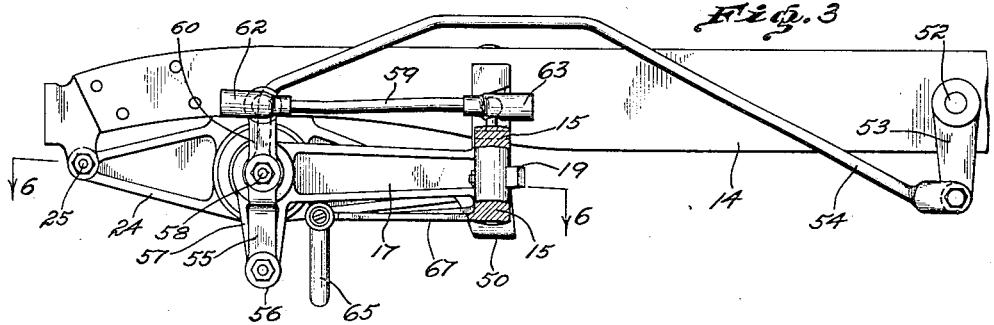
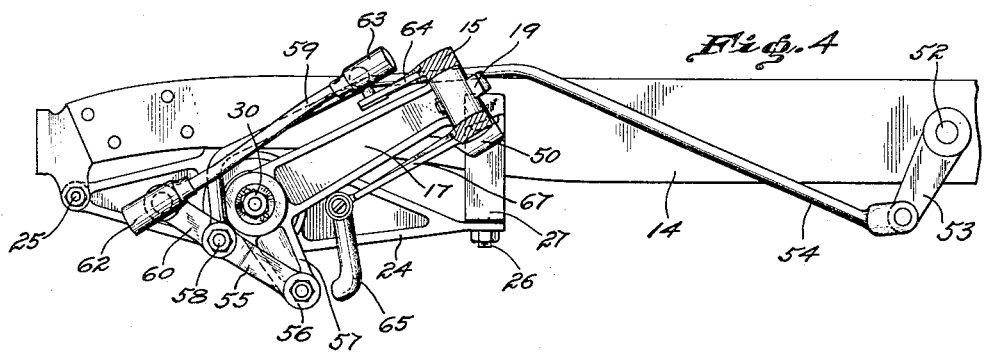
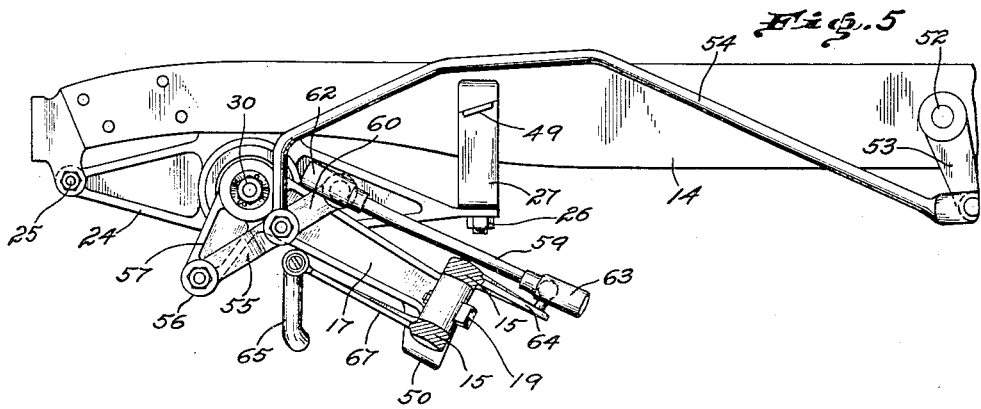

May 1, 1934.   T. C. PROUTY ET AL   1,956,877
VEHICLE STEERING MECHANISM
Original Filed Dec. 28, 1931   3 Sheets-Sheet 3
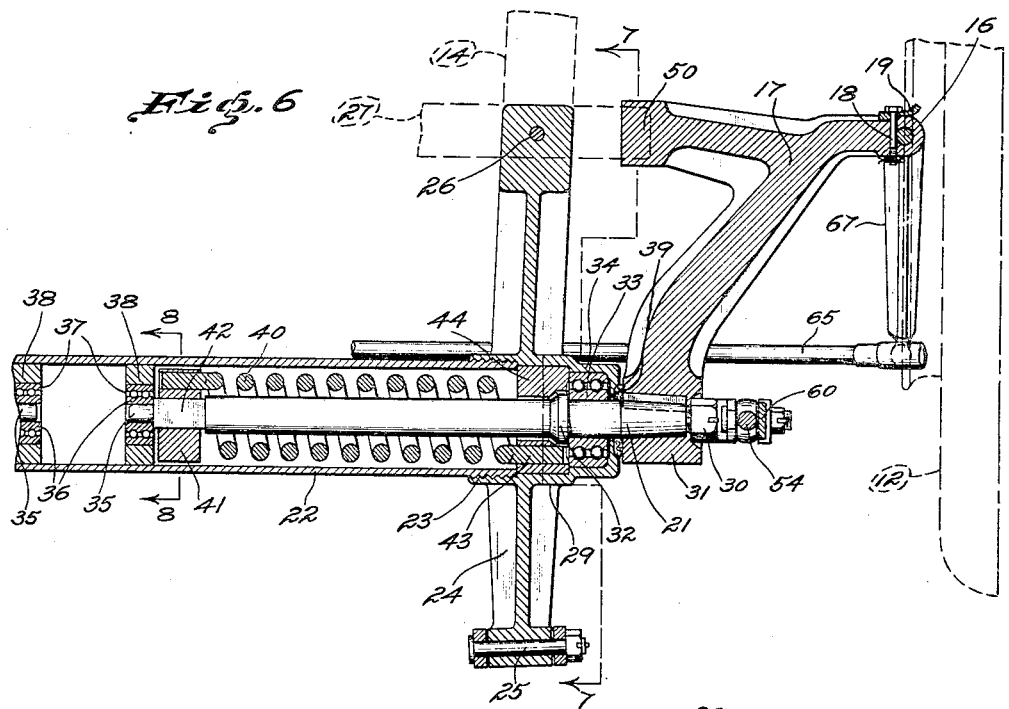
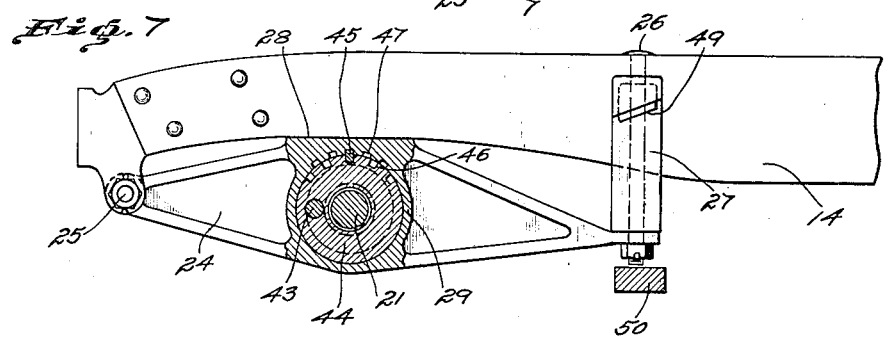
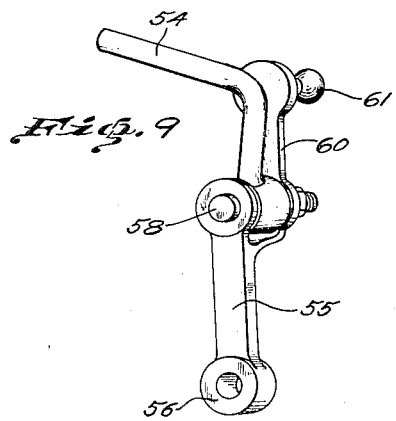
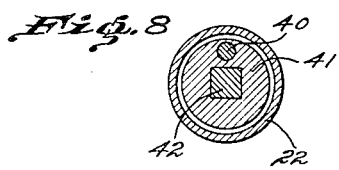
Inventors
THEODORE C. PROUTY, deceased.
DALLAS R. TINKLE.
WILLIS O. PROUTY, ADMINISTRATOR.
by John Flam
Attorney Patented May 1, 1934

1,956,877

UNITED STATES PATENT OFFICE 1,956,877

VEHICLE STEERING MECHANISM

Theodore C. Prouty, deceased, late of Hermosa Beach, Calif., by Willis O. Prouty, administrator, Hermosa Beach, and Dallas R. Trinkle, Manhattan Beach, Calif., assignors, by mesne assignments, to Metlox Corporation, Ltd., Manhattan Beach, Calif., a corporation of California Application December 28, 1931, Serial No. 583,542
Renewed March 12, 1934

9 Claims. (Cl. 280—93)

This invention relates to a vehicle steering mechanism, especially for automotive vehicles.

It has been customary in the past to provide strong leaf springs, interposed between the body of the vehicle and the wheels. In this way, the vertical motion of the wheels occasioned by unevenness in the roadway would be taken up mainly in the springs, and the body of the vehicle would not follow these abrupt jars produced by the roughness of the road.

Such leaf springs have certain disadvantages. For example, the individual leaves must slide with respect to each other during variations in flexure. This necessitates lubrication between the leaves, for otherwise the action of the spring becomes stiff. Furthermore, the construction is expensive, and results in a spring action not particularly well suited to take up all characters of irregularities. Thus for reducing the rebound, it is almost an essential, with such springs, to provide shock absorbers or snubbers.

It is an object of this invention to provide a spring suspension that obviates substantially all of these disadvantages. This is accomplished by using, in place of flat leaf springs, one or more coiled springs such for example as a helix. These helical springs can be readily packed in lubricating grease; and the spring action can be made quite strong and out of proportion to the load imposed. The structure is simple and inexpensive.

When utilized in connection with the front wheels of an automobile, the springs must be so arranged as not to interfere with the steering. It is another object of this invention therefore, to make it possible to incorporate the helical type of spring for the front wheels in such simple manner that the steering function is not appreciably affected.

This invention possesses many other advantages, and has other objects which may be made more easily apparent from a consideration of one embodiment of the invention. For this purpose there is shown a form in the drawings accompanying and forming part of the present specification. This form shall now be described in detail, which illustrates the general principles of the invention; but it is to be understood that this detailed description is not to be taken in a limiting sense, since the scope of the invention is best defined by the appended claims.

Referring to the drawings:

Figure 1 is a front view of an automobile chassis equipped with springs in accordance with this invention;

Fig. 2 is a plan view of the front end of the chassis, some of the parts being shown merely diagrammatically;

Figs. 3, 4 and 5 are detail views, each taken substantially along plane 3—3 of Fig. 2, but illustrating the steering action for various conditions of spring torques;

Fig. 6 is an enlarged detail section, taken along plane 6—6 of Fig. 3;

Fig. 7 is a detailed section, taken along plane 7—7 of Fig. 6;

Fig. 8 is a detail section, taken along plane 8—8 of Fig 6; and

Fig. 9 is a perspective view of one of the lever arms utilized in connection with the invention.

In the present instance there are shown the front wheel structures 11 and 12, mounted on a vehicle chassis structure. This chassis structure is indicated in a diagrammatic manner and is shown as including the longitudinal channel members 13 and 14.

Each of the wheel structures includes a U-shaped clevis such as 15 (Figs. 1, 3, 4, and 5). Each clevis is pivoted on a nearly vertical axis for the purpose of angling the wheel structure, and thereby to steer the vehicle. This pivoting is secured by the aid of a king bolt 16 (Fig. 6). The support for the king bolt, as well as the associated mechanisms being similar for both wheel structures 11 and 12, it is sufficient to confine this description to the wheel structure 12. Whatever is described regarding wheel structure 12 applies as well to wheel structure 11.

The king bolt 16 in this instance is held in a stationary position at the extremity of an arm 17. This can be accomplished for example, by the aid of a screw 19 (Fig. 6) that passes through the arm and across a slot in the bolt 16. The screw 18 also serves to hold a stop member 19, which the clevis 15 engages at the limit of the pivotal movement of the wheel structure 12 about the stationary king bolt. Since a stop such as 19 is provided in connection with each of the two wheel structures 11 and 12, it is apparent that a limit is imposed on both the right and left hand angling movements of the wheel structures, which are connected together for simultaneous movement in a manner to be later described.

The spring suspension of the body 20 with respect to the roadway 21 is accomplished by the aid of springs acting on each of the wheels both at the front and rear of the vehicle. The front suspension involves provisions for permitting angling of the wheel structures for steering. The spring suspension for these front wheel structures will now be described in detail, but with the understanding that the rear wheel suspension can be similarly constructed except that those parts needed for the steering function are omitted.

To secure this spring suspension between the vehicle body 20 and the structures 11 and 12, the arm 17 is so supported that it can be moved about its axis against a resilient force. Thus, this arm 17 is mounted for angular movement about an axis transverse to the vehicle body 20. Arm 17 is so arranged that as the weight carried by the vehicle body 20 is increased, the arm 17 is rotated in a counterclockwise direction (as viewed in Figs. 3, 4, and 5). The resilient force opposing this rotation of arm 17 is provided by one or more coiled springs, the axes of which may be coincident with the axis of rotation of arm 17.

Such a spring suspension as a substitute for the usual leaf spring structure is highly advantageous. It provides a floating support that imparts to the vehicle easier and smoother riding qualities. Furthermore, the direction of the force on arm 17 is such that the resistance of the spring to the rotation of arm 17 increases at a faster rate as arm 17 moves out of the horizontal position. This is due to the fact that the force is acting on an arm having a smaller effective length as the arm 17 moves upward. To impose this resilient resistance, a structure is provided that is shown most clearly in Fig. 6. Arm 17 is keyed to a shaft 21, supported for rotation in a tubular structure 22, extending entirely across the frame of vehicle 20, and accommodating the corresponding shaft and arm cooperating with wheel structure 11. To this tubular member 22 is joined a frame 24, as by screw threads 23, which engage a hub portion 29 of the frame. This frame is of strong ribbed construction. It is joined to the end of channel 14 as by the aid of a bolt 25, extending through one arm of the frame. The other arm of the frame 24 is joined as by a bolt 26 through the channel 14. This bolt also passes through a transverse brace 27. Furthermore, a seat 28 (Fig. 7) is provided between the channel 14 and the frame 24, immediately above the hub portion 29 thereof.

The outer end of shaft 21, where it is keyed to the arm 17 can be slightly tapered. In this way a tight connection is insured, and especially by the aid of a crown nut 30 engaging the threaded extremity of shaft 21 and pulling the tapered portion of the shaft into the hub portion 31 of the arm 17.

The shaft 21 has a shoulder 32 against which is seated the inner race 33 of a set of ball bearings. The outer race is held inside the boss 34 of frame 24. This inner and outer race thus form the elements of a ball bearing adjacent the right hand portion of shaft 21, as viewed in Fig. 6.

The inner end of shaft 21 carries a reduced portion 35 upon which the inner race 36 of a ball bearing structure can be supported. The outer race 37 is held in a ring 38 supported in the tube 22. Since tube 22 is preferably filled with grease or other lubricant, a yielding retaining washer 39 of felt or the like is inserted between the hub 31 of arm 17 and part 34 of the tubular structure.

The yielding resistance against rotation of arm 17 in a counterclockwise direction is secured by the coiled spring 40 encased in the tube 22. One end of the spring 40 is anchored in an anchor block 41 disposed adjacent the inner end of shaft 21 and placed over the square portion 42 of this shaft (Fig. 8). The other end 43 of the spring 40 is similarly engaged in a round anchor block 44 (Fig. 7) which is keyed in the hub 29 of frame 24.

This anchor block 44 is adjustable with respect to hub 29, whereby different degrees of resistance of spring 40 can be secured, for normal load conditions, whereby the angular position of arm 17 during such load conditions can be kept horizontal. This can be accomplished, for example, by the aid of a key 45 (Fig. 7) keying the anchor block 44 into hub 29. There are a number of keyways 46, 47 in each of the parts 29 and 44, arranged in such a way that the key 45 can be inserted in any pair upon proper angular alinement of these two parts. By having the angular spacing of keyways 46 in block 44 different from the angular spacing of the keyways 47 in hub 29, a comparatively fine relative angular adjustment can be secured.

It is apparent that so far as disclosed, arm 17, moving in a counterclockwise direction, will rotate the inner end of spring 40 in the same direction and will wind the spring up in relation to the stationary end 43 of this spring. It has been found that a comparatively few coils are needed for each of the springs 40 associated with each of the arms 17, to secure the desired spring action. The relative angular adjustment between block 44 and hub 29 of frame 24 can be accomplished at the factory to take care of any manufacturing variations, and proper road clearance for normal loads.

In order to disclose one practical embodiment of a spring suspension for a medium weight car, that is, of about 700 pounds of spring weight per wheel, it may be stated that spring 40 may be made of a stock about $1\frac{5}{8}$ inches in diameter and should have about 5½ coils, the inside diameter of which is from 1½ to 2 inches. Of course the total active length of stock in the spring must be proportioned to provide a spring torque under the variations of load to produce the required angular twist of the spring for limiting the total vertical movement of the wheels with respect to the body. When the spring 40 is totally unwound, corresponding to a drop of arm 17 to about the position of Fig. 5, further downward movement of arm 17 is resisted by the resistance of the spring against unwinding.

In order to limit any extreme motion of arm 17 in a counterclockwise direction, the cross brace 27 is provided with a projection 48 (Fig. 1) at each end, which serves as a seat for a resilient stop 49 for an extension 50 of arm 17. This stop acts to ensure against interference between the wheels and the fenders, and also protects the steering mechanism against extreme or harmful displacement even if spring 40 should break.

Figs. 3, 4, and 5 illustrate clearly, the mechanism for angling the wheel structure 12 for different conditions of torque of spring 40. This mechanism is such that the angular position of arm 17 in accordance with the road requirements, has no material effect upon the steering function. This steering mechanism will now be described.

In Fig. 2 there is shown the conventional worm and wheel steering control 51. This control serves to rotate a short transverse shaft 52 shown in this instance as journalled in the channel 14. Located on the outer end of the shaft 52 is a lever or crank 53. A steering link 54 is pivotally joined to this lever.

In Fig. 3 the position of link 54 and lever 53 is indicated when the vehicle is proceeding in a straight direction, the arm 17 being in an intermediate position. It is seen that in this instance, lever arm 53 is vertical. In Fig. 4, the position of link 54 is shown when the vehicle is being steered toward the left, while arm 17 is in its extreme load sustaining position. In Fig. 5, the position of link 54 is shown when the vehicle is being steered to the right and where the spring torque is substantially a minimum, arm 17 being near its lowermost position.

Link 54, as shown most clearly in Figs. 3, 4, 5, and 9, is pivoted to an arm 55. The lower end of this arm 55 carries a hub portion 56 by the aid of which it is pivoted to an extension 57 of arm 17. This extension 57 is shown as substantially at right angles to the main arm 17. When main arm 17 is in the intermediate position of Fig. 3, the pivot 58 of link 54 is in alinement with shaft 21 of arm 17, while the vehicle is proceeding in a straight direction. In other words, the rotation of arm 55 on extension 57 in one direction or the other will cause this pivot 58 to cross the axis of shaft 21. The distance between the axis of hub 56 and axis 53 is the same as the distance between the axis of arm 17 and the center of the hub at the extremity of arm 57. This relationship is of importance because it eliminates substantial interference of the steering function by the operation of the spring torque device.

Thus a consideration of Fig. 3 shows that when arm 17 rotates in either direction, there is no effect upon the steering link 54, since the axis of steering link 54 is coincident with that of arm 17.

A drag link 59 is in mechanical connection with the lever arm 55 to rotate the wheel structure 12 about king bolt 16. To accomplish this result, lever arm 55 has an extension 60 which carries one element of a ball and socket joint, such as ball 61 (Fig. 9). This is engaged by the usual spring socket structure 62 on drag link 59. The other end of drag link 59 has a spring socket structure 63 which cooperates with a crank 64 (Fig. 2) attached to the upper part of the clavis 15. As shown clearly in Fig. 2, this crank 64 extends normally in a direction transverse to the vehicle body 20. Now as link 54 is moved in a forward direction toward the position of Fig. 4, it is seen that the link 59 is also pulled in a forward direction. This causes crank 64 to turn in a counterclockwise direction, and the wheel structure 12 as viewed in Fig. 2 will be angled in a counterclockwise direction to steer the vehicle toward the left with respect to the driver.

Similarly, when link 54 is pulled toward the rear of the vehicle, as exemplified in Fig. 5, the link 59 is also moved toward the rear, and crank 64 is rotated in a clockwise direction to steer the vehicle toward the right.

The left steering position indicated in Fig. 4 is shown when arm 17 is sustaining substantially the maximum torque of spring 50. However, this steering position of the wheel structure is not appreciably altered even if arm 17 moves downward from the position of Fig. 4, corresponding to a decreased torque on spring 40. Thus if we assume such a downward movement, the pivot 58 of lever 54 stays stationary, because link 54 is held in that position by the worm and wheel 51. The hub 56 of arm 54 is moved in a clockwise direction, as well as the ball and socket connection 62 of link 59. This has a tendency to urge link 59 toward the right, or to the rear of the vehicle. However, a clockwise rotation of arm 17 also brings crank 64 downwardly, as viewed in Fig. 4. Accordingly the rearward movement of link 59 is taken by this change in position of crank 64, without necessitating material rotation of crank 64 about its own axis.

Similar considerations show that for the other extreme position of Fig. 5, the motion of arm 17 upward merely serves to move the arm 55 and extension 60 and to pull link 59 to the left without material rotation of crank 64.

These beneficial results are due to the particular arrangement of lever 55 with respect to arm 17.

In order that the angling of wheel structure 11 be in time with the angling of wheel structure 12, use is made of a tie rod between the two wheel structures. This tie rod is a common expedient in connection with automobile structures. It is shown in this instance as a rod 65 extending transversely of the vehicle and joined by ball and socket joints at its extremities to the crank arms 66 and 67. These crank arms extend in a forward direction, as shown most clearly in Fig. 6, and are joined to the lower hub of the U-shaped clevis 15. Since the point of connection between the crank 67 and tie rod 65 is quite close to the axis of rotation of arm 17, there is only a slight raising or lowering of the tie rod 65 as the arm 17 rotates.

What is claimed is:

1. In a vehicle structure, an arm having a pivot transverse to the structure, resilient means opposing rotation of the arm in one direction, a wheel structure pivotally mounted near the end of the arm for permitting steering of the vehicle, and means whereby said wheel structure can be moved about its pivotal mounting, comprising a steering link, and means for so connecting said link to the wheel structure that rotation of the arm within limits leaves the angularity of the wheel structure substantially unaffected.

2. In a vehicle structure, an arm having a pivot transverse to the structure, a resilient means opposing rotation of the arm in one direction, a wheel structure pivotally mounted near the end of the arm for permitting steering of the vehicle, and means whereby said wheel structure can be moved about its pivotal mounting, comprising a steering link, a lever pivoted to the arm and below the main pivot of the arm, and connected to the link, and a link mechanism between the lever and the wheel structure.

3. In a vehicle structure, an arm having a pivot transverse to the structure, resilient means opposing rotation of the arm in one direction, a wheel structure pivotally mounted near the end of the arm for permitting steering of the vehicle, and means whereby said wheel structure can be moved about its pivotal mounting, comprising a steering link, a lever carried by an extension of the arm and pivoted to the extension, said link being pivoted to the lever at an intermediate point which point as the lever moves about its own pivot, passes over the main pivot of the arm, a crank fastened to the wheel structure, and a connection between the crank and the free end of the lever.

4. In a vehicle wheel suspension, a pivotally mounted arm, a wheel structure mounted on the arm for angling movement on an axis transverse to the axis of the arm, and a link substantially parallel to the arm, pivotally connected to the wheel structure at one end of the link, said link having an effective length substantially the same as the distance between the axis of the arm and the transverse axis of rotation of the wheel structure.

5. In a vehicle wheel suspension, a pivotally mounted arm, a wheel structure mounted on the arm for angling movement on an axis transverse to the axis of the arm, and means for angling said structure, including a crank fastened to the wheel structure, a link pivoted to the free end of the crank at one end of the link, a lever pivoted on the arm on an axis parallel to the arm axis, the other end of the link being pivoted to the lever, said link being substantially parallel to the arm.

6. In a vehicle wheel suspension, a pivotally mounted arm, a wheel structure mounted on the arm for angling movement on an axis transverse to the axis of the arm, and means for angling said structure, including a crank fastened to the wheel structure, a link pivoted to the free end of the crank at one end of the link, a lever pivoted on the arm on an axis parallel to the arm axis, the other end of the link being pivoted to the lever, said link being substantially parallel to the arm, and having an effective length substantially the same as the distance between the axis of the arm and the transverse axis of rotation of the wheel structure.

7. In a vehicle wheel suspension, an arm pivotally mounted on the vehicle chassis, a wheel structure mounted on the arm for angling movement on an axis transverse to the axis of the arm, means resiliently resisting rotation of the arm in a direction corresponding to a movement of the wheel structure toward the chassis, a link substantially parallel to the arm, pivotally connected to the wheel structure at one end of the link, said link having an effective length substantially the same as the distance between the axis of the arm and the transverse axis of rotation of the wheel structure, and means for moving the link.

8. In a vehicle wheel suspension, an arm pivotally mounted on the vehicle chassis, a wheel structure mounted on the arm for angling movement on an axis transverse to the axis of the arm, means resiliently resisting rotation of the arm in a direction corresponding to a movement of the wheel structure toward the chassis, and means for angling said structure, including a crank fastened to the wheel structure, a link substantially parallel to the arm, pivotally connected to the free end of the crank at one end of the link, a lever pivoted on the arm on an axis parallel to the arm axis, the other end of the link being pivoted to the lever, said link being substantially parallel to the arm and having an effective length substantially the same as the distance between the axis of the arm and the transverse axis of the wheel structure, and means for moving the link.

9. In a vehicle wheel suspension, a pivotally mounted arm, a wheel structure mounted on the arm, and a link substantially parallel to the arm, pivotally connected to the wheel structure at one end of the link, and pivotally joined to the arm.

DALLAS R. TRINKLE.
WILLIS O. PROUTY,
*Administrator of the Estate of Theodore C. Prouty, Deceased.*